P. R. WEATHERFORD.
Rotary and Drag Harrow.
No. 229,505.  Patented June 29, 1880.
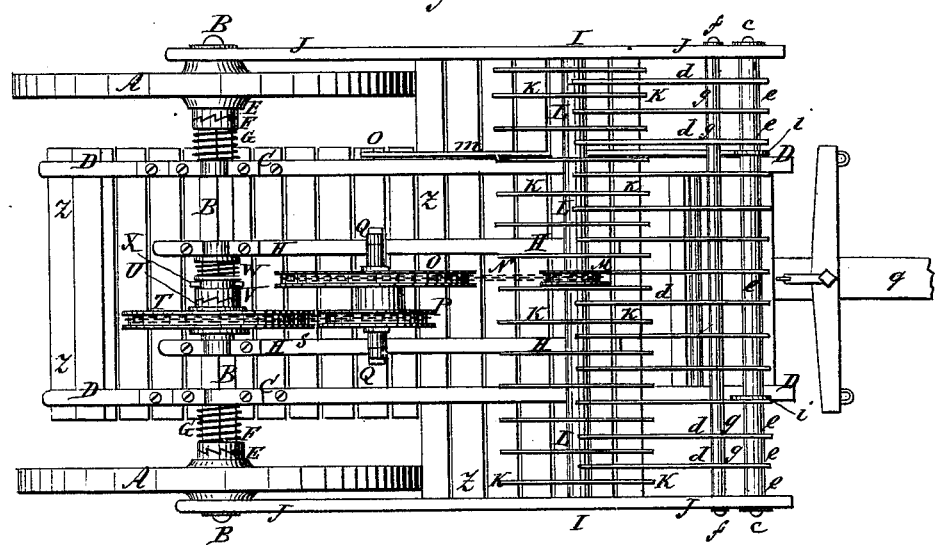

UNITED STATES PATENT OFFICE.

PERRY R. WEATHERFORD, OF WAVERLY, KENTUCKY, ASSIGNOR TO HIMSELF AND ALEXANDER KING, OF SAME PLACE.

ROTARY AND DRAG HARROW.

SPECIFICATION forming part of Letters Patent No. 229,505, dated June 29, 1880.

Application filed March 9, 1880. (No model.)

*To all whom it may concern:*

Be it known that I, PERRY R. WEATHERFORD, of Waverly, in the county of Union and State of Kentucky, have invented a new and useful Improvement in Combined Rotary and Drag Harrows, of which the following is a specification.

Figure 1 is a bottom view of the improvement. Fig. 2 is a sectional side elevation.

The object of this invention is to furnish combined rotary and drag harrows so constructed that they can be adjusted to work at any desired depth in the ground, and can be readily raised from and lowered to the ground.

Similar letters of reference indicate corresponding parts.

A represents the wheels, the axle B of which revolves in brackets C, attached to the frame D, to raise the said frame D to such a height from the ground that the revolving harrow may be placed beneath it. Upon the inner ends of the hubs of the wheels A are formed clutch-teeth E, with which engage the teeth of the clutches F. The clutches F slide upon the axle B and turn with it, and are held against the hubs of the wheels A by springs G, placed upon the axle B and interposed between the clutches F and the brackets C, so that one of the wheels A in turning may move faster than the other without sliding. The axle B also revolves in bearings attached to the rear parts of two parallel bars, H, which are placed at such a distance apart as to receive the driving-gearing between them.

In bearings in the forward ends of the bars H revolves a shaft, I, the ends of which revolve in bearings in the forward parts of the bars J. The bars J are placed parallel with the bars H, and their rear ends are pivoted to the ends of the axle B.

Upon the shaft I are secured the centers of harrow-teeth K, the working parts of which are curved to the rearward, as shown in Fig. 2. The harrow-teeth K are kept at a proper distance apart by tubular blocks or washers L, placed upon the shaft I between the said teeth K.

To the shaft I, between the forward ends of the bars H, is attached a chain-wheel, M, around which passes an endless chain, N. The endless chain N also passes around the chain-wheel O, rigidly connected with another chain-wheel, P. The journals of the chain-wheels O P revolve in bearings in the lower ends of the arms Q, which rest in grooves in the outer sides of the bars H, and are slotted longitudinally to receive the screws or bolts R, that secure the said arms Q to the bars H, so that the tension of the endless chains can be regulated by adjusting the said arms Q.

Around the chain-wheel P passes an endless chain, S, which also passes around a chain-wheel, T. The chain-wheel T revolves upon a sleeve bushing or bearing placed or formed upon the axle B. Upon one end of the hub of the wheel T are formed clutch-teeth U, which engage with the teeth of the clutch V, placed upon the said axle B. The clutch V is held forward by a spring, W, interposed between it and the bearing of the bar H. The clutch V is thrown out of gear with the chain-wheel T by a lever, X, pivoted to a bracket, Y, attached to the platform Z. The platform Z is attached to the frame D to prevent the driver from being annoyed by soil thrown by the revolving harrow-teeth K.

*a* is the driver's seat, the standard *b* of which is attached to the platform Z.

To the forward ends of the bars J are attached the ends of a shaft, *c*, upon which are placed the ends of the harrow-teeth *d*. The harrow-teeth *d* are kept in place and at the proper distance apart by tubular blocks or washers *e*, placed upon the said shaft *c* between the ends of the said harrow-teeth *d*. Through holes in the harrow or drag teeth *d*, at a little distance from their upper ends, is passed a shaft, *f*, upon which, between the harrow-teeth *d*, are placed tubular blocks or washers *g*, to keep the said harrow-teeth at the proper distance part. The ends of the shaft *f* are attached to the lower ends of short arms *h*, the upper ends of which are attached to the bars J, near their forward ends. The harrow-teeth *d* are slightly curved and are inclined to the rearward, as shown in Fig. 2.

The drag-teeth *d* and the rotating teeth K are so placed as to alternate with each other, as shown in Fig. 1.

To the shaft *c* are attached the lower ends of two bars, *i*, the upper ends of which are pivoted to the ends of arms *j*, rigidly attached to the ends of a shaft, *k*. The shaft *k* works in bearings attached to the side bars of the frame D, and to one of its ends is rigidly attached an arm, *l*, projecting in the opposite direction from the arms *j*, and which may be a continuation of one of the said arms. To the end of the arm *l* is pivoted the upwardly-curved end of a rod, *m*, which slides in keepers *n*, attached to a side bar of the frame D. The rear end of the rod *m* is pivoted to the lower end of the lever *o*, which is pivoted to the frame D or to the platform Z, or to a support attached to the said frame or platform. The upper part of the lever *o* projects across and moves along an arched bar, *p*, attached to the platform Z, and which has one or more notches formed in it to receive the lever *o* and hold it in position. With this construction, by operating the lever *o* the harrow-teeth K *d* can be raised from the ground for convenience in turning around and passing from place to place.

*g* is the tongue, to which the draft is applied, and which is rigidly attached to the forward end of the frame D.

Having thus fully described my invention, I claim as new and desire to secure by Letters Patent—

A combined rotary and drag harrow constructed substantially as herein shown and described, consisting of the carriage A B D, the pivoted bars H J, the rotary harrow I K L, the drag-harrow *c d e f g h*, the driving mechanism M O P T N S, and the supporting and adjusting mechanism *i j k l m o*, substantially as herein shown and described.

P. R. WEATHERFORD.

Witnesses:
   J. W. JENKINS,
   C. W. ALLIN.